United States Patent [19] [11] 4,172,110
Caesar et al. [45] Oct. 23, 1979

[54] MANUFACTURE OF FIRE PROTECTION MATERIALS BASED ON ALKALI METAL SILICATES

[75] Inventors: Arndt C. Caesar, Frankenthal; Ludwig Zuern, Bad Durkheim; Rudi Weindel, Roemerberg, all of Fed. Rep. of Germany

[73] Assignee: BASF Aktiengesellschaft, Fed. Rep. of Germany

[21] Appl. No.: 815,227

[22] Filed: Jul. 13, 1977

[30] Foreign Application Priority Data

Aug. 13, 1976 [DE] Fed. Rep. of Germany ....... 2636430

[51] Int. Cl.$^2$ ............................................. B29C 27/14
[52] U.S. Cl. ....................................... 264/109; 106/74; 106/84; 264/60; 264/118; 264/42; 264/133; 264/333; 106/15.05
[58] Field of Search ....................... 106/74, 15 FP, 84; 264/60, 118, 109, 133, 333

[56] References Cited

U.S. PATENT DOCUMENTS 3,483,006 12/1969 Vassilevsky ............................ 106/74
3,912,481 10/1975 Bartholomew ........................ 106/74

FOREIGN PATENT DOCUMENTS 1127270 4/1962 Fed. Rep. of Germany.
933410 8/1963 United Kingdom.
944133 12/1963 United Kingdom.
1051078 12/1966 United Kingdom.

Primary Examiner—Harold D. Anderson
Attorney, Agent, or Firm—Keil & Witherspoon

[57] ABSTRACT

A process for the manufacture of fire protection materials, in which an aqueous alkali metal silicate solution is dried to a water content of from 6 to 40% and the resulting powder is thermoplastically molded to form sheets, tapes or strips. These can be fitted into openings and passages of building units; in the event of a fire they eliminate water and form a stable, heat-insulating foam.

11 Claims, No Drawings

MANUFACTURE OF FIRE PROTECTION MATERIALS BASED ON ALKALI METAL SILICATES

The present invention relates to a process for the manufacture of fire protection materials by thermoplastic processing of predried alkali metal silicates having a defined water content.

It is known that moldings, e.g. sheets or strips, of alkali metal silicates containing water, when exposed to heat in a fire, form a fine-celled, firm, non-combustible and heat-insulating foam which, due to the foaming pressure developed, is capable of effectively sealing joints, gaps and other openings and passages in building units against the passage of fire and smoke.

German Published Applications DAS Nos. 1,169,832, 1,176,546 and 1,471,005 disclose a process for the manufacture of such fire protection sheets. In this process, reinforcing fibers or fabrics are embedded in a cast layer of an alkali metal silicate solution or suspension; the water is then partially removed by heating and the layer is consolidated to form a sheet. However, drying of relatively thick sheets is expensive and time-consuming, above all if they are manufactured individually and in large numbers. In practice, the drying time requested for the manufacture of commercial fire protection sheets from alkali metal silicates containing water is at least from 1 to 4 hours even if efficient drying installations are used.

German Laid-Open Application DOS No. 2,055,283 discloses a process for the manufacture of silicate foams for building elements, in which a finely divided alkali metal silicate, which contains less than 5% of water, is hydrated to a water content of from 5 to 30% and is then foamed. An alternative method for the manufacture of silicate foams, in which alkali metal silicate solutions are subjected to controlled dehydration, is described as disadvantageous since it is expensive and leads to non-uniform elimination of water.

We have found that fire protection materials can be manufactured particularly advantageously by first converting an alkali metal silicate solution, by predrying, into a free-flowing or pourable mass and then molding this mass thermoplastically to give the desired moldings.

The present invention relates to a process for the manufacture of a fire protection material, which comprises the following steps:

A. A liquid alkali metal silicate/water mixture containing from 45 to 95% by weight of water is dried to a water content of from 6 to 40% by weight, B. The resulting mass is mixed, if desired, with reinforcing agents and other additives, and is converted to the plastic state by heating to from 40° to 110° C., C. Simultaneously or subsequently, the plastic mass is compression-molded and D. The moldings obtained are cooled, after which they may or may not be provided with coatings.

In this process, the water to be expelled is not removed from the molded articles, which in most cases have a large surface and are thick, but instead is removed from the fluid solution before molding. Using efficient commercial drying equipment, it is possible to dry alkali metal silicate solutions very rapidly and economically to give products which are pourable solids at room temperature and have defined residual water contents. The advantages inherent in the conventional process of manufacture of fire protection sheets, such as easy molding, especially in the case of articles of large surface area, reliable embedding of fillers, fibers or fabrics, and the like, also distinguish the process according to the invention. The disadvantages of the conventional process, such as the expensive dehydration and consolidation of the moldings, are substantially avoided by carrying out these stages prior to molding.

The starting material is a fluid alkali metal silicate/water mixture containing from 45 to 95, preferably from 50 to 80, % by weight of water. The silicates are preferably sodium, potassium or lithium silicates with a molar ratio $Me_2O:SiO_2$ of from 1:1 to 1:6, especially from 1:2.5 to 1:4. The aqueous solution is now dried by means of conventional drying equipment, e.g. drum dryers, spray dryers, spray towers or vacuum dryers, to a water content of from 6 to 40, preferably of from 15 to 35, % by weight.

The drying should be carried out at material temperatures below 100° C., since alkali metal silicates which have been dried at higher temperatures in general lose the property of foaming when exposed to a fire, even if they still contain sufficient residual water. However, most drying equipment operates particularly economically at air temperatures far above 100° C., so that it may at times happen, and is unavoidable, that the material temperature will briefly, or even for a prolonged period, exceed 100° C. In such cases the moldings obtained after thermoplastic processing should be stored, after shaping and any coating process, but before further processing, for several days, preferably for from 2 to 10 days, at room temperature. This causes the moldings to recover their ability to foam in the event of a fire.

On drying the alkali metal silicate solution, a pulverulent, flowable or pourable mass is obtained, which preferably consists of particles having a mean diameter of from 0.01 to 5.0, preferably of from 0.05 to 1.0, mm. In general, if conventional dryers, e.g. spray dryers, are used, the powder obtained has a relatively broad particle size spectrum, i.e. in addition to numerous fine particles some coarse constituents are also obtained. This is often advantageous since on pouring the powder a denser packing of the particles is achieved, and the latter can then be compressed more easily during molding. The particle size distribution can be broadened further by using special nozzle designs of the spray equipment to produce droplets of different size, leading to particles of different size being obtained after drying. Because of the varying residence time in the dryer, the small particles are dried more extensively then the large; accordingly, the water content data represent mean values. This mixture of coarser and finer, moister and drier, particles is surprisingly free-flowing and shows no tendency to cake in reservoirs and metering vessels. The residual water content of the mixture can, if necessary, readily be corrected by adding traces of water or by spraying with steam, without essentially detracting from the free-flowing character of the product. By means of this measure, it is possible, where necessary, to achieve better cohesion during molding or easier embedding of fibrous materials.

In spite of the use of particles with different water contents and hence different expandability, the process according to the invention gives flame protection materials which, in the event of a fire, give a homogeneous, fire-retardant foam.

The mass which is produced in process stage A and which is preferably free-flowing or pourable is mixed in stage B, if desired, with reinforcing agents, with or without other additives, and is converted simultaneously or subsequently to the plastic state by heating to from 40° to 110° C., preferably from 70° to 100° C. Reinforcing agents which may be incorporated are textile fibers, metal fibers or mineral fibers, fabrics, mats or nets. In this way, mechanically particularly resistant moldings are obtained; if the reinforcing agents are located in one plane, foaming in the event of a fire takes place in a defined direction at right angles to this plane. It is particularly preferred to incorporate glass fibers, in amounts of from 1 to 25, preferably from 2 to 10, % by weight, based on the total mixture. In addition, conventional dyes, pigments, foaming assistants and wetting agents may be incorporated to achieve special effects, and carbohydrates, which on heating form a carbon skeleton, may be added to raise the melting point.

Plasticization can be effected on various equipment; preferably, the pulverulent mass is poured onto a continuous moving steel belt and is heated thereon by means of radiation heating or contact heating or by exposure to hot air. However, heating can also be effected whilst the material is exposed to pressure, simultaneously with the molding process of stage C, for example on heated rolls or in extruders.

The plastic mass can be molded by means of all conventional molding equipment, such as stamping presses or sheet presses, roller presses, calenders, mills with smooth or profiled rolls, or extruders. Moldings of any desired shape and size may be produced, e.g. sheets, continuous strips or web-like profiles. Preferably, webs from 0.5 to 10 mm thick are manufactured and these may subsequently be cut lengthwise into strips which are from 1 to 100 cm wide, preferably from 2 to 10 cm wide.

The moldings manufactured according to the invention require at most a slight subsequent drying, if any.

The moldings are then cooled and can advantageously be provided immediately afterwards with coatings to protect them against mechanical damage and above all against loss of water and against penetration of water and of $CO_2$. Suitable coatings are plastic films or metal foils, e.g. aluminum foils. However, the moldings can also be coated with finishes based on polyvinyl chloride, epoxy resins or polyurethanes, which, where appropriate, can subsequently be cured. The moldings can be provided with a durable and complete coating by dipping, spraying or brushing. This can be done in a simple manner directly after molding, so that the heat communicated to the moldings for the purpose of the molding process can be utilized to cure the surface coating. At high throughputs, in particular, this acceleration of curing saves costs. It is also possible directly to coat the alkali metal silicate particles which have been dried in stage A.

In the Examples, parts and percentages are by weight.

EXAMPLE 1

A sodium silicate solution containing about 65% of water and having a molar ratio of $Na_2O:SiO_2$ of 1:3.3 is sprayed in a spray dryer and dried at an air temperature of about 110° C. The selected residual water content is 34% by weight. The pulverulent and granular mixture, with a mean particle diameter of 0.2 mm, is applied, by means of a hopper provided with a comb-like distributor bar, onto a steel belt, to form 6 separate parallel continuous strips of powder.

These strips are heated to a material temperature of about 95° C. by infrared radiators which radiate vertically downwards. The steel belt is passed through a mill with a smooth lower roll, whilst the upper roll is provided with 6 wedge-shaped grooves which are from 25 to 27 mm wide and 3 mm deep. The grooves press and mold the pulverulent heated strands into continuous profiles of size 25×3 mm. The strands are detached from the steel belt by a downward change of direction of the latter and are fed by means of a roller track into a second mill, the grooves of which bring the strands to their final size of 25×2.5 mm. The water content of the strands is now 33% by weight. The 6 strands then pass through a dipping bath containing a polyurethane surface coating, which is applied as a layer about 0.1 mm thick and is crosslinked in a downstream curing tunnel. The strands are wound up, cut to length and packaged.

EXAMPLE 2

Commercial sodium silicate solution (containing 65% of water) is sprayed in a spray dryer and converted to a mixture of fine and coarse particles having a residual water content of 36%. The material is cooled to room temperature and then mixed, in a forced mixer, with glass fibers chopped to an 8 mm length, in the ratio of 20:1.

The mold of a compression molding press is first filled to the extent of about 50% with this mixture by means of a loading slide, the mold is lowered into the final position, and a mesh of 0.5 mm thick wire with a mesh size of 15×15 mm, the mesh having been cut to the appropriate size by hand and premolded into a semi-cylindrical shape, is inserted. The mold is completely filled by means of a loading slide and the pressing process is carried out in the conventional manner by pre-pressing, breathing and afterpressing. The top and bottom halves of the mold are heated (material temperature 95° C.). The total pressing time depends on the size and particularly the thickness of the molding which in the present case is a pipe covering reinforced with glass fibers and wire mesh and has a length of 100 mm, a diameter of 100 mm and a wall thickness of 5 mm.

Pipe coverings thus obtained are passed, on frames, through a dipping bath in order to apply a surface coating based on an epoxy resin; after the coating has cured tack-free, the moldings are sorted and packaged.

EXAMPLE 3

Granular and pulverulent alkali metal silicate prepared as described in Example 1 is mixed with chopped glass fiber (6 mm length) in a mixer and the mixture is applied as a flat strand onto a steel belt, where it is heated from above and below to a material temperature of 95° C. and pre-compressed by means of a smooth roll. After leaving the steel belt, the strand passes through a profiling mill in which 7 continuous strip-shaped profiles are formed simultaneously. These then pass through a dipping bath where the surface is sealed with a polyurethane finish, after which they pass through a curing tunnel and are wound up.

EXAMPLE 4

A composition prepared as described in Example 1 and having a residual water content of 34% is fed by means of a bucket wheel to a profiling mill resembling a briquetting press, on which the material, which is at a temperature of 90° C., is converted to saddleshaped moldings of size 30×15×2 mm which, in the form of a loose packing, resembling Raschig rings, permit ready passage of air through the packing whilst, on exposure to high temperatures, e.g. in the event of a fire, they foam up to fill the volume occupied by the packing. The saddle-shaped moldings are sealed over their entire surface by means of a polyurethane finish in a fluidized bed, in order to protect them against the action of water or $CO_2$.

We claim:

1. A process for the manufacture of a fire protection material which comprises the steps of:
   A. drying a liquid alkali metal silicate/water mixture containing from 45 to 95% by weight of water, based on the alkali metal silicate/water mixture, to a water content of from 15 to 35% by weight, based on the weight of said mixture;
   B. converting the resulting pulverulent mass to the plastic state by heating to a temperature of from 70° to 100° C.;
   C. compression-molding the plastic mass; and
   D. cooling the molding and then coating the cooled molding with plastic films or metal foils.

2. A process for the manufacture of a fire protection material set forth in claim 10, in which the liquid alkali metal silicate/water mixture is dried at temperatures below 100° C.

3. A process for the manufacture of a fire protection material as set forth in claim 1, in which, on drying the liquid alkali metal silicate/water mixture, a temperature of 100° C. is exceeded periodically, and the molding, after any coating process, is stored for from 2 to 10 days at room temperature before being further processed.

4. A process for the manufacture of a fire protection material as set forth in claim 1, in which the material produced after drying in step A is free-flowing or pourable and consists of fine particles having a mean diameter of from 0.01 to 5.0 mm.

5. A process for the manufacture of a fire protection material as set forth in claim 1, in which, in step B, metal, textile or mineral fibers, fabrics, mats or nets are incorporated into the material as a reinforcement.

6. A process for the manufacture of a fire protection material as set forth in claim 5, in which glass fibers, in an amount of from 1 to 25% by weight based on the total mixture, are incorporated as a reinforcement.

7. A process for the manufacture of a fire protection material as set forth in claim 1, in which the plastic mass is molded, in step C, to give webs which are from 0.5 to 10 mm thick, and which are then cut lengthwise into strips which are from 2 to 100 cm wide.

8. A process for the manufacture of a fire protection material as set forth in claim 1, in which the molding is coated with polyvinyl chloride, epoxy resins or polyurethanes.

9. A process for the manufacture of a fire protection material as set forth in claim 1, in which the plastic mass from step C is simultaneously molded.

10. A process for the manufacture of a fire protection material as set forth in claim 1, in which the plastic mass from step C is subsequently molded.

11. A process for the manufacture of a fire protection material as set forth in claim 1, in which the alkali metal silicate is sodium, potassium or lithium silicate with a molar ratio of alkali metal oxide:$SiO_2$ of from 1:1 to 1.6.

* * * * *

UNITED STATES PATENT AND TRADEMARK OFFICE
CERTIFICATE OF CORRECTION

PATENT NO. : 4,172,110
DATED : October 23, 1979
INVENTOR(S) : CAESAR ET AL

It is certified that error appears in the above—identified patent and that said Letters Patent is hereby corrected as shown below:

IN THE CLAIMS

Claim 2, second line, "claim 10" should have been changed to read--claim 1--

Signed and Sealed this

Twenty-second Day of April 1980

[SEAL]

Attest:

SIDNEY A. DIAMOND

Attesting Officer     Commissioner of Patents and Trademarks